Aug. 31, 1954   F. J. LARSEN   2,687,611
TURBINE BLADE TEMPERATURE CONTROL APPARATUS
Filed March 23, 1950
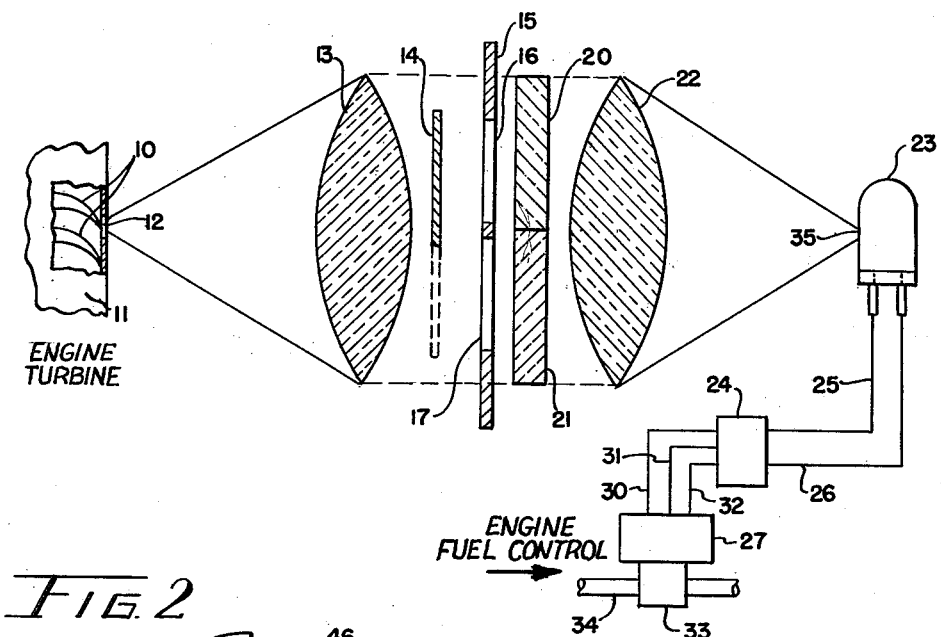
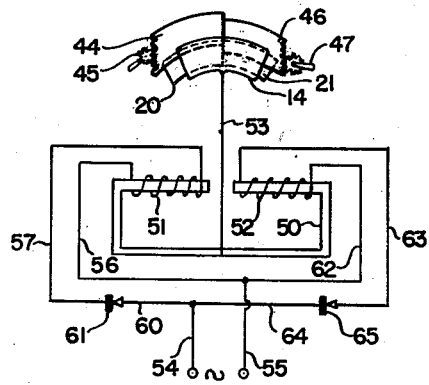
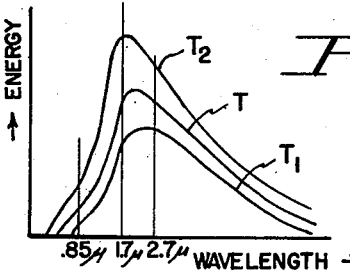
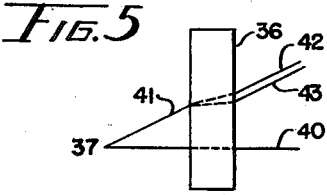
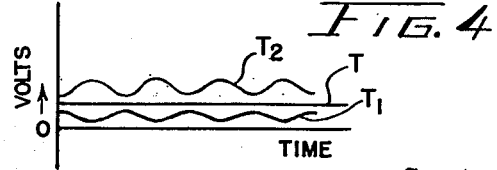
Inventor
FINN J. LARSEN
George H Fisher
Attorney Patented Aug. 31, 1954

2,687,611

UNITED STATES PATENT OFFICE 2,687,611

TURBINE BLADE TEMPERATURE CONTROL APPARATUS

Finn J. Larsen, Minneapolis, Minn., assignor to Minneapolis-Honeywell Regulator Company, Minneapolis, Minn., a corporation of Delaware Application March 23, 1950, Serial No. 151,437

5 Claims. (Cl. 60—39.28)

This invention comprises an optical type temperature control apparatus for controlling and limiting high temperatures such as found in jet engines or gas turbines at the turbine wheels.

For thermodynamic reasons, it is desired to operate jet engines, gas turbines and the like at as high a temperature as possible but, due to limitations of the materials used for constructing such engines, a practical high limit of temperature must be observed. To further complicate the problem, the temperature in jet engines and gas turbines may vary rapidly so that a temperature responsive indicator or controller must speedily respond to prevent the temperature of the turbine parts from exceeding the practical high limit. It is therefore an important object of this invention to provide an improved sensing device for use in apparatus for controlling the maximum allowable operating temperature in a jet engine, gas turbine or the like.

Because of the fast response required by the engine, it is advantageous to use radiation responsive apparatus incorporating a photocell or like element. However, photocells vary in sensitivity within each cell over the energy responsive area and if energy were to strike comparatively widely separated areas of the energy responsive surface the conductivity would vary appreciably and the accuracy of the sensing device would be quite low. It is therefore another object of this invention to provide an optical sensing device containing a photocell wherein the energy waves from the sensed portion of the jet engine, gas turbine or the like, strike overlapping or small adjacent areas of the energy responsive surface of the photocell.

When energy waves pass through transparent material such as glass after striking the surface nonperpendicularly, the waves are refracted, with the energies of different wavelengths having different indices of refraction. Also, different substances through which energy waves pass have different indices of refraction for the energy waves of various wavelengths passed. Sometimes such properties are desirable as, for example, with prisms, which use these principles to cause a divergence of the waves of different wavelengths and separate them into bands of waves of closely similar wavelengths. However, when the energy waves strike normal to the surface of a filter, for example, there is no refraction and the waves are not diverged thereby permitting the use of small compact equipment which utilizes all of the waves which pass through the filter and permitting more accurate focusing of the waves. It is therefore a further object of the invention to provide an optical sensing device using filters in which the dispersion of the energy waves is minimized.

Briefly, the invention encompasses a sensing device primarily intended for use with a jet engine in which the sensing device is operated upon by energy waves radiating from a heated surface, such as the turbine blades, to produce an electrical signal which is fed into an amplifier. The amplifier in turn operates a valve in the fuel line to control the amount of fuel sent to the combustion chamber of the jet engine.

For a better understanding of the invention reference is had to the following detailed description, taken in conjunction with the accompanying drawings, in which:

Figure 1 is a schematic view of the present apparatus;

Figure 2 shows a preferred type of shutter used in the sensing device;

Figure 3 is a graph showing the energy disposition per wavelength for various temperatures;

Figure 4 is a graph showing the voltage output of the sensing device to the amplifier for various temperatures of the source; and Figure 5 is a sketch showing how energy waves may be refracted upon penetrating a filter or the like.

Referring first to Figure 1, energy waves emanate from turbine blades 10 in a housing 11 through a window or opening 12. The energy waves can be considered to emanate from a point source and pass through the window in diverging paths. The energy waves are intercepted by a lens 13, which deflects the waves so that after passing through the lens they move in parallel paths. In order that the lens 13 may deflect the energy waves into paths parallel with each other the lens must be positioned, as is well known, so that the distance between the lens and the source of energy is equal to the focal length of the lens.

A shield 15, positioned behind the lens in the paths of the waves and having openings 16 and 17 adjustable in area, passes two separate portions of the energy waves to a pair of filters 20 and 21 which are placed side by side so that the energy waves which pass through opening 16 impinge upon filter 20 and the waves which pass through opening 17 impinge upon filter 21. The energy waves which are passed by these filters are then deflected by a lens 22 to converge upon an energy responsive area of a photocell 23 thereby causing an electrical signal to be generated, the magnitude of the signal being dependent upon the energy of said waves. A shutter 14 is positioned behind the lens 13 in the paths of the waves to alternately block the passage of the waves through the aforementioned openings 16 and 17.

The signal induced in photocell 23 controls an amplifier 24, which may be of the type shown in the Upton Patent 2,423,534, through conductors 25 and 26. The amplifier 24 controls the energization of a motor 27 to which it is connected by conductors 30, 31 and 32, as in the Upton patent. The motor 27 operates a valve 33 in fuel line 34 and thus regulates the supply of fuel for the nozzles in the combustion chamber of the jet engine to control the combustion and thus the temperature of the gas stream which strikes the turbine blades 10. The motor 27 may be of any reversible two phase type capable of being operated by the output of amplifier 24 to control the valve 33.

As is well known to those skilled in the art, a source of radiating energy radiates the energy over a band of wavelengths with the energy radiated at one particular wavelength, depending upon the temperature of the source, being greater than the amount of energy radiated at the other wavelengths. This has been indicated graphically in Figure 3 which shows the energy distribution from a source over a band of wavelengths for three separate temperatures of the source.

The curve designated as T shows the disposition over a relatively broad band of wavelengths of the energy radiated from a source having a temperature of 2000° F. Curve $T_1$ shows the energy disposition from a source having a temperature less than 2000° F. The curve $T_1$ is displaced toward the right with respect to curve T and the peak energy for the curve $T_1$ is less than that for curve T. Curve $T_2$ represents the energy disposition from a source having a temperature greater than 2000° F. and is displaced toward the left with respect to curve T. Curve $T_2$ also has a higher peak energy than does curve T. A comparison of these curves shows that as the temperature of the source of radiating energy increases, the wavelength at which the maximum energy is radiated becomes shorter. Also, the energy radiated at the wavelength at which the maximum energy is radiated becomes greater with increased temperature, as does the total energy radiated, though for the present use the last two characteristics mentioned are not important.

If it were possible to obtain them commercially, the two filters 20 and 21 could be so chosen that if, for example, it is desired that the turbine blades be heated to 2000° F., filter 20 would pass energy of 1.7 microns wavelength and filter 21 would pass energy of 2.7 microns wavelength and the percentage of energy transmitted would be the same. In Figure 3 the curve for temperature T, as stated previously, shows the disposition over the band of wavelengths of energy radiated by a source having a temperature of 2000° F. and on the graph the amount of energy from a source at 2000° F. at the two wavelengths of 1.7 microns and 2.7 microns is the same. Thus, if filter 20 were to pass energy of 1.7 microns wavelength and filter 21 were to pass energy of 2.7 microns wavelength, and the same amount of surface on each filter were struck by energy waves from the turbine blades, the amount of energy passed by each filter would be the same.

Because of the present difficulty in obtaining filters having the exact characteristics desired, that is, filters which have high and equal percentages of transmission of energy of the particularly desired wavelengths and which block energy of wavelengths immediately longer and shorter than the desired wavelengths, it is necessary to use available filters or combinations of filters and properly mask them to obtain the desired result. In apparatus which was constructed and successfully operated, a Corning 7-69 filter which has a maximum percentage of transmission of energy at about 0.85 micron wavelength was used as filter 20. A combination of Corning filters 5-61 and 2-62 which have a maximum percentage of transmission of energy at about 2.5 microns wavelength were used and considered as a single filter 21. The effective area of filter 21 was then reduced by masking until the amount of energy radiated by the source at 2000° F. and passing through each of filters 20 and 21 and striking the energy responsive surface of cell 23 was the same.

The energy waves at these two wavelengths, after passing through the filters, are deflected by lens 22 to impinge upon an area of photocell 23 identified as spot 35.

It has been found that a lead sulphide cell is sensitive to energy at wavelengths of from about 0.6 micron to 3.0 microns and so is particularly adapted for use as the photocell in this apparatus where it is desired to measure temperatures around 2000° F. Obviously, any photoelectric device having suitable characteristics may be substituted for this use.

As is well known, it is difficult, if not commercially impossible, to make photocells in which the energy responsive area of the photocell is completely uniform over its entire surface in its response to energy. It is therefore desirable that the spot impinged by the energy waves be as small as possible consistent with proper operation of the cell.

It is also well known that filters do not pass energy of merely a single wavelength but rather pass energy over a comparatively narrow band of wavelengths. Also, an energy wave which strikes nonperpendicularly to a surface of a transparent or translucent material, such as a filter, and which passes on through the material, is refracted at both surfaces of the filter. The indices of refraction for the energy at various wavelengths which are passed through the filter differ so that the energies at different wavelengths are split up and tend to diverge. If this situation were to be permitted the spot on the photocell impinged by the energy waves would tend to be larger than necessary for best operation of the cell. Because of the variation in the energy responsive surface the noise level would then be higher than that minimum which could be attained by causing the energy waves to strike the filters at an angle normal to the surfaces of the filters so that the energy waves would not be refracted. Figure 5 shows energy waves emanating from a source 37 and passing through a filter 36 with some of the energy waves traveling along line 40 and so striking perpendicularly to the surface of the filter and passing directly through the filter. The energy waves traveling along line 41 become refracted and split up into paths such as 42 and 43. To keep the spot 35 reasonably small by causing the energy waves to travel in parallel paths and strike the filters normal to their surfaces to eliminate refraction is the purpose of lens 13. It would be possible, of course, at a sacrifice of intensity of the signals, to eliminate the need for lens 13 by placing the shutter, shield, filters, lens 22 and photocell 23 at a distance from the turbine housing so that the only waves which enter this system would be those which may be considered as to already be traveling in substantially parallel paths.

The shutter 14, more completely shown in Figure 2, is operated by an electromagnet having a core 50 with windings 51 and 52 wound about the ends of the core. The shutter is mounted on a reed 53 attached to the center portion of the core. The winding 51 is connected to alternating voltage power conductors 54 and 55 in the following manner; from power lead 54 through conductor 60, rectifier 61, conductor 57, winding 51, and conductor 56 to power lead 55. Hence current can flow through winding 51 during only half of the voltage cycle and thus pull reed 53 toward the end of core 50 on which winding 51 is wound during said half of the cycle. Winding 52, wound on the other end of core 50, is connected to alternating voltage power conductors 54 and 55 in the following manner; from power lead 55 through conductor 62, winding 52, conductor 63, rectifier 65 and conductor 64 to power lead 54, so that winding 52 is energized only on the half cycles that winding 51 is not energized so that reed 53 is pulled toward the end of core 50 on which winding 52 is wound only on the half cycles during which it is not pulled toward the other end of core 50. Therefore, reed 53 is pulled positively in each direction on alternate half cycles so that it continually vibrates about a central fixed axis at a rate which cannot change even though the voltage from the source should vary. As shutter 14 alternately closes off windows 16 and 17 it is seen that this type of arrangement for operating the shutter permits the energy waves to pass through each window for an equal period of time.

As best seen in Figure 2, a movable shield, or masking means 44 may be moved by a manual control 45 to mask off part of filter 20. In the same manner, a movable shield, or masking means 46 may be moved by a manual control 47 to mask off part of filter 21.

With the movable shield 46 in the partially closed position, as shown, and the temperature of the turbine blades 10 being at 2000° F. the amount of energy passed by filters 20 and 21 on alternate half cycles is the same. As a result, the amount of energy impinging upon photocell 23 is constant, as is shown by curve T in Figure 4.

The potential output of the cell 23 with movement of the shutter is shown for several temperatures of the source by the curves of Figure 4. The curve denoted as T is, as in the case of Figure 3, for a source having a temperature of 2000° F. and it is to be observed that it is a straight line, meaning that the amount of energy which strikes the cell remains constant. Because the same amount of energy per unit of width, measured from the adjoining edges of the filters to the outer edges, is passed by each filter at this temperature the total amount of energy passed by the two filters and striking the cell is constant throughout a full cycle of movement by the shutter. Amplifier 24 is not energized as it is responsive only to an alternative voltage signal. Motor 27 does not operate and the position of valve 33 does not change and so the same amount of fuel continues to pass to the nozzles in the combustion chamber.

If the temperature of the turbine blades 10 should now drop below 2000° F. the energy curve is displaced and takes the form of the curve of $T_1$ as shown in Figure 3. It can be seen that the amounts of energy of the wavelengths passed by the filters are decreased and the ratio between the amounts of energy of these wavelengths changes. This results in the energy waves striking photocell 23 so as to form a sinusoidal voltage pattern, which is shown by curve $T_1$ in Figure 4.

The curve $T_1$ is, as in the case of Figure 3, for a source having a temperature less than 2000° F. and is sinusoidal in shape. The amount of energy radiated by the source and passed by the two filters is not the same per unit of width for a source having temperatures less than 2000° F., as can be determined from Figure 3 by comparing the ratio of the energies radiated by the source at temperatures of 2000° F. and less than 2000° F. at wavelengths of 0.85 micron and 2.5 microns. Therefore, the total amount of energy passed by the two filters varies, with movement of the shutter, from a maximum value when filter 21, passing energy of 2.5 microns wavelength, is completely uncovered by the shutter, to a minimum value when filter 20, passing energy of 0.85 micron wavelength is completely uncovered by the shutter.

The resultant alternating current output from the photocell results in selective energization of amplifier 24 to cause operation of motor 27 in such a direction as to open valve 33 to enable more fuel to be sent to the nozzles in the combustion chamber and thus increase the temperature of the gas stream striking the turbine blades 10.

If, now, the temperature of the turbine blades should rise above 2000° F. the energy curve is displaced in the opposite direction and appears as curve $T_2$ in Figure 3. In this case filter 20, the 0.85 micron filter, passes much more energy ratiowise than does filter 21 so that the energy striking photocell 23 is displaced by 180° from that of the previously described situation and is represented by curve $T_2$ in Figure 4.

The curve $T_2$ is for a source having a temperature greater than 2000° F. and is sinusoidal but is of the opposite phase with reference to curve $T_1$. This is because the ratio of the amount of energy passed by filter 20 with respect to the amount of energy passed by filter 21 is less when the source is at 2000° F. than when it is at a temperature greater than 2000° F.

This causes energization of amplifier 24 in the opposite phase, resulting in reverse operation of motor 27 to cause valve 33 to reduce the amount of fuel passing through the nozzles in the combustion chamber.

It is thus seen that with the apparatus herein shown and thus far described the temperature of the turbine blades can be controlled around a temperature of 2000° F. If, however, it is desired to control about a temperature other than 2000° F. it is possible to do so with the apparatus herein shown by merely moving one of the movable shields 44 or 46 to change the ratio of the exposed area of the filters. Thus, if it is desired to control about a temperature less than 2000° F. it is merely necessary to operate lever 47 to move movable shield 46 to close off more of filter 21 until the amount of energy of 2.5 microns wavelength passing through filter 21 is the same as the amount of energy of 0.85 micron wavelength passing through filter 20 of the desired temperature.

If it should be desired to control about a temperature higher than 2000° F. it is merely necessary to move lever 45 to move movable shield 44 partly over filter 20 until the amount of energy of 0.85 micron wavelength passing through filter 20 is the same as the amount of energy of 2.5 microns wavelength passing through filter 21 at the desired temperature.

It is thus seen that by merely using a pair of movable shields to partially close off the apertures through which the energy waves pass to the filters it is possible to control over a range of temperatures without having to change filters or photocells. Thus, once the apparatus has been set up it may be used to control for a variety of temperatures without having to readjust the position of the photocell or changing the filters.

Modification may obviously be made by those skilled in the art while yet remaining within the spirit of the present invention and I therefore limit myself only to the extent of the appended claims.

I claim as my invention:

1. In apparatus for controlling the temperature of a source of radiant energy to a desired value, the source radiating waves of energy having a relatively broad band of wave lengths, the energy being a maximum for a particular wave length depending upon the temperature of the source; a photoelectric cell; means defining a first path and a second path for the passage of radiant energy between the source and said cell, said means comprising, a first lens for intercepting the passage of energy waves from the source and redirecting the waves along parallel paths in a single direction, a second lens positioned between said first lens and said cell for intercepting the parallel directed waves of energy and converging the waves on said cell, a first filter mounted between said first and second lenses intercepting the waves of energy passing along the first path, said filter passing only waves of energy of a predetermined first relatively narrow band of wave lengths, and a second filter mounted between said first and second lenses intercepting the waves of energy passing along the second path, said filter passing only waves of energy of a predetermined second relatively narrow band of wave lengths; first adjustable masking means interposed between said first filter and said first lens blocking a predetermined portion of energy passing along the first path; second adjustable masking means interposed between said second filter and said first lens blocking a predetermined portion of energy passing along the second path, said first and second masking means being adjusted so that the amounts of energy received by said cell passing along the first and second paths are equal when the temperature of the source is at the desired value; a shutter interposed between said first and second lenses alternately blocking energy passing along the first and second paths at a predetermined frequency; control means for controlling the temperature of the source; electronic circuit means; and circuit connecting means including said electronic circuit means for connecting said cell to said control means so that upon a deviation of the temperature from the desired value the total energy received by said cell along the first path will exceed the total energy received by said cell passing along the second path and thereby cause energization of said control means to restore the temperature to the desired value.

2. In apparatus for controlling the temperature of the turbine blades of a combustion engine to a desired value, the blades radiating waves of energy having a relative broad band of wave lengths, the energy being a maximum for a particular wave length depending on the temperature of the blades, a photoelectric cell; means defining a first path and a second path for the passage of radiant energy between the blades and said cell, said means comprising, first optical means for intercepting the passage of energy waves from the blades and redirecting the waves along parallel paths in a single direction, second optical means positioned between said first optical means and said cell for intercepting the parallel directed waves of energy and converging the waves on said cell, first adjustable aperture means mounted between said first and second optical means controlling the amount of energy passing along the first path, and second adjustable aperture means mounted between said first and second optical means controlling the amount of energy passing along the second path; first filter means mounted between said first aperture means and said second optical means passing only waves of energy of a predetermined first relatively narrow band of wave lengths; second filter means mounted between said second aperture means and said second optical means passing only waves of energy of a predetermined second relatively narrow band of wave lengths; a shutter arranged between said optical means alternately covering said first and second aperture means and thereby alternately blocking at a predetermined rate the energy passing along the first and second paths; fuel control means for controlling the rate of fuel to a combustion engine; signal amplification means; and circuit connection means including said signal amplification means for connecting said cell to said fuel control means so that upon a deviation of the temperature of the blades above a desired value the total energy received by said cell along one of the paths will exceed the total energy received by the cell along the other path and thereby cause said fuel control means to reduce the fuel flow to the engine.

3. In apparatus for controlling the temperature of a source of radiant energy to a desired value, the source radiating waves of energy having a relatively broad band of wave lengths, the energy being a maximum for a particular wave length depending upon the temperature of the source, a photoelectric cell; means defining a first path and a second path of the passage of radiant energy between the source and said cell, said means comprising, a first lens intercepting the passage of energy waves from the source and redirecting the waves along parallel paths in a single direction, a second lens positioned between said first lens and said cell intercepting the parallel directed waves of energy and converging the waves on said cell, a first filter mounted between said first and second lenses intercepting the waves of energy passing along the first path, said filter passing only waves of energy of a predetermined first relatively narrow band of wave lengths, and a second filter mounted between said first and second lenses intercepting the waves of energy passing along the second path, said filter passing only waves of energy of a predetermined second relatively narrow band of wave lengths; first adjustable masking means positioned adjacent said first filter for blocking a predetermined portion of energy passing along the first path;

second adjustable masking positioned adjacent said second filter for blocking a predetermined portion of energy passing along the second path, said first and second masking means being adjusted so that the amounts of energy received by said cell passing along the first and second paths are equal when the temperature of the source is at the desired value; and a shutter arranged between said first and second lenses to alternately block energy passing along the first and second paths at a predetermined frequency.

4. In apparatus for controlling the temperature of the turbine blades of a combustion engine to a desired value, the blades radiating waves of energy having a relative broad band of wave lengths, the energy being a maximum for a particular wave length depending on the temperature of the blades, a photoelectric cell; means defining a first path and a second path for the passage of radiant energy between the blades and said cell, said means comprising, first optical means for intercepting the passage of energy waves from the blades and redirecting the waves along parallel paths in a single direction, second optical means positioned between said first optical means and said cell for intercepting the parallel directed waves of energy and converging the waves on said cell, first adjustable aperture means interposed between said first and second optical means controlling the amount of energy passing along the first path, and second adjustable aperture means interposed between said first and second optical means controlling the amount of energy passing along the second path; first filter means interposed between said second optical means and said first aperture means passing only waves of energy of a predetermined first relatively narrow band of wave lengths; second filter means interposed between said second optical means and said second aperture means passing only waves of energy of a predetermined second relatively narrow band of wave lengths; and a shutter arranged between said first and second lenses alternately covering said first and second aperture means and thereby alternately blocking the energy passing along the first and second paths at a predetermined rate.

5. In apparatus for controlling the temperature of a source of radiant energy to a predetermined value, a photocell; means separating the waves radiating from the source into a first beam of energy and a second beam of energy, said means comprising, first optical means intercepting the diverging waves from the source and redirecting the waves in parallel paths, second optical means positioned between said first optical means and said cell converging the waves of energy upon said cell, first filter means interposed between said first and second optical means passing energy waves of a first narrow band of energy waves of the first beam, and second filter means interposed between said first and second optical means passing energy waves of a second narrow band of wave lengths of the second beam; adjustable shielding means positioned between said first filter means and said first optical means controlling the amount of energy passing along the first beam; and blocking means arranged between said first and second optical means alternately blocking the energy waves passing through said filter means.

References Cited in the file of this patent

UNITED STATES PATENTS

| Number | Name | Date |
|---|---|---|
| Re. 21,806 | Johnson | May 20, 1941 |
| 1,816,047 | Kueffel | July 28, 1931 |
| 1,919,182 | Fitzgerald | July 18, 1933 |
| 1,999,023 | Sharp et al. | Apr. 23, 1935 |
| 2,152,645 | Holven et al. | Apr. 4, 1939 |
| 2,227,147 | Lindsay | Dec. 31, 1940 |
| 2,237,713 | Russell | Apr. 8, 1941 |
| 2,245,033 | Harrison | June 10, 1941 |
| 2,251,019 | Mawha | July 29, 1941 |
| 2,302,554 | Kingsbury | Nov. 17, 1942 |
| 2,439,373 | Stearns | Apr. 6, 1948 |
| 2,569,911 | Ziebolz | Oct. 2, 1951 |
| 2,589,414 | Martin et al. | Mar. 18, 1952 |